(12) United States Patent
Barge et al.

(10) Patent No.: US 6,841,035 B2
(45) Date of Patent: Jan. 11, 2005

(54) METHODS AND APPARATUS FOR APPLYING A SECONDARY CLOSURE TO AN ASSEMBLY OF A LID ATTACHED TO A BATTERY BOX

(75) Inventors: Christopher Stephen Barge, Cheltenham (GB); Laurie Gardener, Cheltenham (GB)

(73) Assignee: TBS Engineering Limited, Gloucestershire (GB)

( * ) Notice: Subject to any disclaimer, the term of this patent is extended or adjusted under 35 U.S.C. 154(b) by 224 days.

(21) Appl. No.: 10/169,998
(22) PCT Filed: Jan. 15, 2001
(86) PCT No.: PCT/GB01/00130
§ 371 (c)(1), (2), (4) Date: Jul. 12, 2002
(87) PCT Pub. No.: WO01/52334
PCT Pub. Date: Jul. 19, 2001

(65) Prior Publication Data
US 2003/0000649 A1 Jan. 2, 2003

(30) Foreign Application Priority Data
Jan. 14, 2000 (GB) .............................................. 0000779

(51) Int. Cl.$^7$ ............................................. B30B 15/34
(52) U.S. Cl. .................................................... 156/583.1
(58) Field of Search .................................. 156/228, 292, 156/322, 499, 583.1

(56) References Cited

U.S. PATENT DOCUMENTS
4,596,625 A * 6/1986 Alvarez ....................... 156/499

FOREIGN PATENT DOCUMENTS
EP  0 327 208  8/1989

OTHER PUBLICATIONS
Patent Abstracts of Japan, vol. 008, No. 070, Apr. 3, 1984.
* cited by examiner

*Primary Examiner*—Chris Fiorilla
*Assistant Examiner*—Sing P. Chan
(74) *Attorney, Agent, or Firm*—Young & Thompson

(57) ABSTRACT

An assembly 10 comprising a battery box 11 and a lid 12. The lid 12 defines a well 13 for receiving a secondary closure 14, with the well providing fining access to the battery box 11. The secondary closure is applied to a battery box lid by a secondary closure applying apparatus. This comprises essentially three units: a lid and battery box assembly locating unit 16, a heated platen unit 17 and a closure applicator 18. By engaging lid 12, rather tan box 11, any offset positioning of the lid relative to the box, is substantially removed. Orientation of platen and closure 14 is made in response to the detected position of the well 13 and/or lid 12.

14 Claims, 3 Drawing Sheets

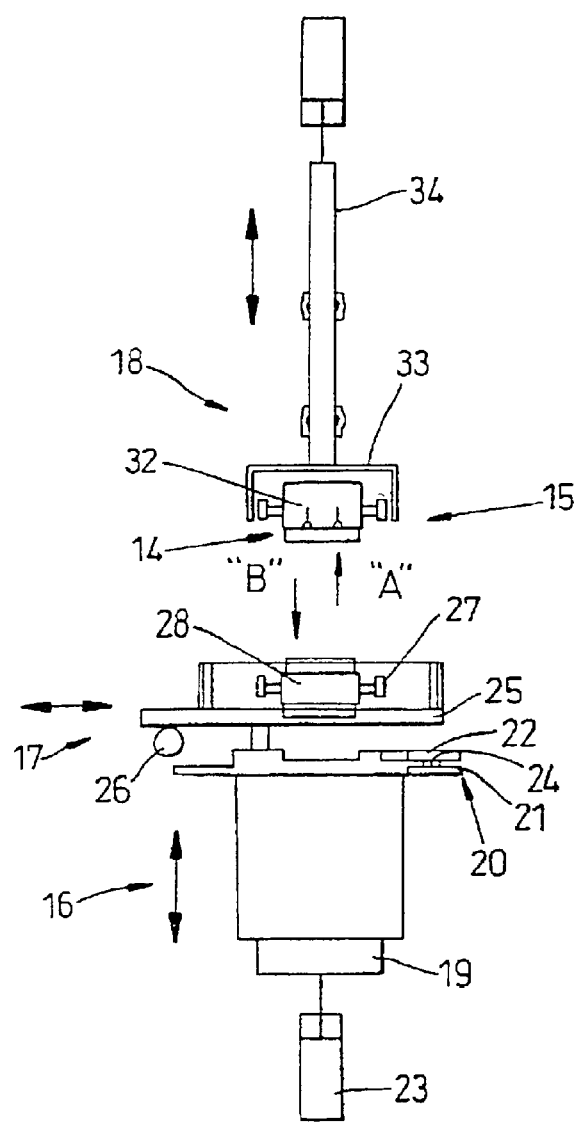
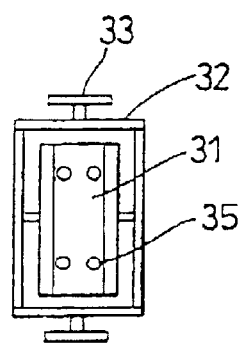
Fig. 5
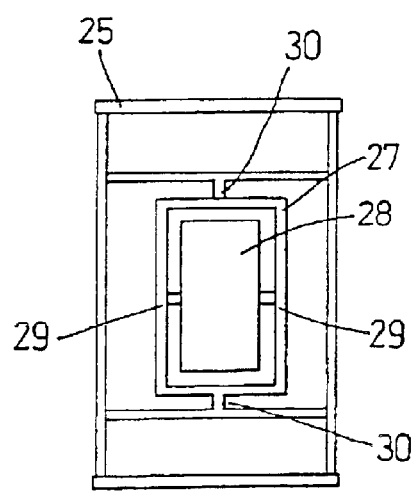
Fig. 6
Fig. 4

METHODS AND APPARATUS FOR APPLYING A SECONDARY CLOSURE TO AN ASSEMBLY OF A LID ATTACHED TO A BATTERY BOX

FIELD OF THE INVENTION

This invention relates to methods and apparatus for applying a secondary closure to an assembly of a lid attached to a battery box.

BACKGROUND OF THE INVENTION

For many years it has been known to manufacture sealed battery boxes by interposing a heated platen between the top edge of a battery box and the underneath of a lid to heat co-operating surfaces, removing the platen and pressing the lid onto the box. This apparatus has proved to be extremely satisfactory and there are a large number of such machines in existing manufacturing lines throughout the world. Such batteries usually had a plastic secondary cover or closure which could be clipped onto the lid and removed to allow topping up of the battery. More recent battery developments have enabled manufacturers to design a completely sealed unit in which the secondary closure has to be sealed onto the lid, once the battery has been suitably filled with electrolyte.

It has now been discovered that the majority of lid fixing machines, which exist in the manufacturing lines, are not particularly accurate and small deviations in lid position relative to the battery box occur. This is not only in the lateral and longitudinal positioning of the lid, but also in its orientation.

It is perfectly possible to overcome these problems with better engineering of the lid fixing equipment and the applicants have manufactured a machine which consistently assembles lids with the required accuracy. However, the investment in existing machines is such that this approach only provides a long term solution and currently battery manufacturers are rejecting a significant percentage of batteries because of mis-fitting secondary closures.

SUMMARY OF THE INVENTION

From one aspect the invention consists in apparatus for applying a secondary closure to an assembly of a lid attached to a battery box including at least one stop or the like for locating the assembly in a predetermined position, a holder for a secondary closure, a heatable platen interposable between and engageable with the closure and the lid to heat respective cooperable engageable surfaces thereof and a load applicator for engaging the heated surfaces to fix the closure to the lid characterised in that the locating stop or the like locates the lid in a predetermined position and in that the apparatus includes a platen support for allowing the platen to move to take up the orientation of the engageable surface of the lid and a holder support to allow the orientation of the closure to be determined by the orientation of the platen.

To put it another way both the platen and the closure holder are "floating" so that their orientation is determined by the orientation of the lid. Thus any inaccuracies in the orientation of the lid are thereby automatically compensated. Further by locating the assembly by engaging the lid, the position of the lid can be placed accurately longitudinally and transversely relative to the platen. Previously the assembly had always been located by the position of the box.

From a further aspect the invention consists in apparatus for applying a secondary closure to an assembly of a lid attached to a battery box including at least one stop or the like for locating the assembly in a predetermined position, the holder for the secondary closure, a heatable platen interposable between and engageable with the closure and the lid to heat respective co-operable engageable surfaces thereof and a load applicator for engaging the heated surfaces to fix the closure to the lid characterised in that the locating stop or the like locates the lid in a predetermined position and the apparatus further includes respective supports for each of the holder and platen for allowing rotation of the holder or platen about orthogonal axes in respective generally parallel planes which are further generally parallel to the predetermined position of the lid.

In either of these arrangements the supports may be in the form of gimbals. The apparatus may further comprise guides for engaging the lid to guide it into a predetermined position and, in that case the stop or the like may be mounted on the guides.

From a still further aspect the invention consists in a method of applying a secondary closure to an assembly of a lid attached to a battery box, the lid defining a seat for the closure, the method including engaging a first face of a heated platen against the seat so that it takes the orientation of the seat, engaging the closure against the opposite face of the platen so that it takes the orientation of the platen, removing the platen and engaging the orientated closure against the seat.

From a still further aspect the invention consists of apparatus for locating a secondary closure on the lid of a battery box including at least one detector for detecting the position and/or orientation of the lid or a part thereof and a closure applicator responsive to the detector for adjusting the orientation and/or position of the closure prior to application, in accordance with the detected position/orientation.

From yet another aspect, the invention consists in apparatus for applying a secondary closure to an assembly of a lid attached to a battery box including at least one stop or the like for locating the assembly in a predetermined position, a holder for a secondary closure, a heatable platen interposible between and engageable with the secondary closure and the lid to heat respective co-operable engageable surfaces thereof and a load applicator to engaging the heated surfaces to fix the secondary closure to the lid, characterized in that the locating stop or the like comprises a seat for the battery box lid positionable between the heatable platen and the battery box and in that the apparatus also includes a battery box support for allowing the battery box to move so that the battery box lid takes up the orientation of an engageable surface of the battery box lid seat.

Although the invention has been defined above it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which:

FIG. 4 is a schematic side view of the apparatus of the invention with the platen holder partly in section with a closure and lid and battery box assembly located therein;

FIG. 5 is a plan view of a closure holder on the arrow A;

FIG. 6 is a plan view on the arrow B of the platen and its holder; and

DETAILED DESCRIPTION OF THE DRAWINGS

Figure 1:
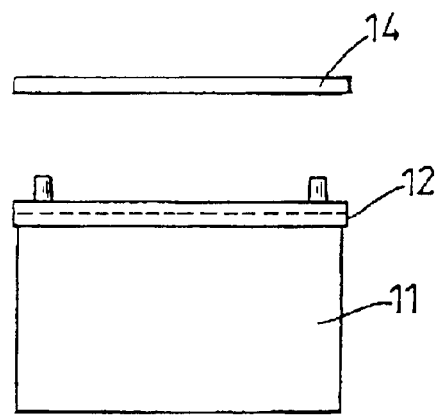
FIG. 1 is a side view of a lid and battery box assembly with a secondary closure positioned above it.
Figure 2:
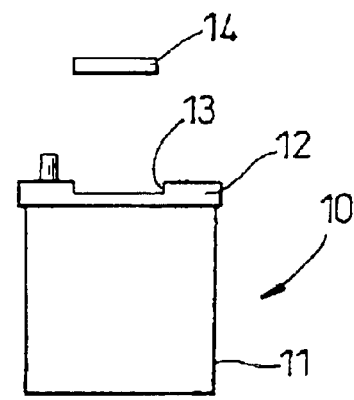
FIG. 2 is an end view of FIG. 1.
Figure 3A:
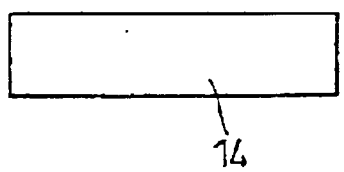
FIG. 3a is a view from above of the secondary closure and FIG. 3b is a view from above of the lid and battery box assembly.
Figure 3B:
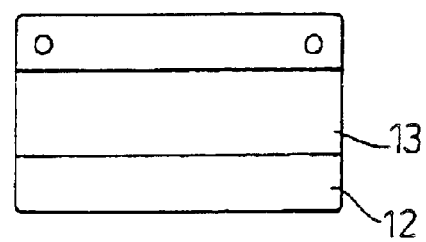

As can be seen in FIGS. 1 to 3 an assembly 10 comprises a battery box 11 and a lid 12. The lid 12 defines a well 13 for receiving a secondary closure 14 the well provides filling access to the battery box 11, as previously described.

Turning to FIG. 4 a secondary closure applying apparatus is schematically and generally indicated at 15. This comprises essentially three units: a lid and battery box assembly locating unit 16, a heated platen unit 17 and a closure applicator 18.

The unit 16 comprises a support 19 onto which the pre-formed lid and battery box assembly 10 is delivered by a conveyor (not shown) and a guide and stop assembly 20. The guide and stop assembly 20 includes guides 21 which engage the lid 12 as it is moved onto the support 19 to locate laterally the lid 12 in a predetermined, position. Mounted on one of the guides 21 is an end stop 22, which also engages the lid 12, and locates the battery box longitudinally in its predetermined position. The support 19 is mounted on a ram 23 which enables the battery box to be raised and lowered. The stop 22 can be swung out of the way on its pivot 24 when the closure applying process is complete.

The platen unit 17 comprises a carriage 25 that can be moved laterally, as indicated by the arrows, by means of a gear wheel 26, which is driven by a motor (not shown). Mounted on the carriage is a gimbal 27 that supports a heatable platen 28. The gimbal 27 allows the platen to rotate about the horizontal axes defined by the pairs of stub axials 29 and 30.

The closure applicator includes a closure holder 31 which is mounted in a gimbal 32 on a head 33. The head 33 is in turn carried by a ram 34, so that the head 33 can be moved vertically as indicated by the arrows.

The closure support 31 has orifices 35 which are connected to a vacuum source (not shown) so that the closure 12 can be releasably held thereon, as shown in FIG. 4.

In use, the assembly 10 is delivered onto the support 19 by the conveyor (not shown) and, as it moves onto the support 19, the lid 12 is engaged by guides 21 and subsequently by a stop 22 so that the assembly 10 is held both laterally and longitudinally in a predetermined position. Thus as has been mentioned before, by engaging the lid 12 rather than the box 11, any longitudinal or lateral offset of the lid 12 with respect to the box 11 is effectively taken out of the equation. Commonly the secondary closures will arrive loosely fitted on the main lid in which case they will need to be picked up initially by the head 33 prior to the insertion of the platen 28 above the box. Alternatively the secondary closures can be provided directly to the head 33, from a cassette or the like.

The carriage 25 is then driven by a gear 26 so that it is interposed between the well 13 and the closure 14. A ram 23 is then activated to press the well against the platen 28 and, because the platen 28 is mounted in the gimbal 27, the platen takes up the orientation of the well 13. A ram 34 is then activated bringing the closure 14 against the other face of the platen 28 and the closure 14 can then take up the orientation of the platen 28 because it in turn is effectively mounted on the gimbal 32. As soon as appropriate heating has taken place the lid and the box are retracted and the gear 26 withdraws the carriage 25 and platen 28 and the orientated closure 14 is pressed against the seats formed in the well 13 to seal it therein.

It will be appreciated that rams 23 and 34 could be activated simultaneously, but because of the lower thermal capacity of the closure 14 there is some benefit in allowing the platen 28 to engage the well 13 first. It may alternatively be desirable to provide a thermal break within the platen, although that could cause some difficulties with platen manufacture due to thermal stresses. It will be appreciated that the gimbal 32 needs to be sufficiently stiff to maintain the position of the closure 14 once it has been orientated by the platen 28, but alternatively means could be provided for releasably locking the gimbal once the platen has been engaged.

Figure 7:
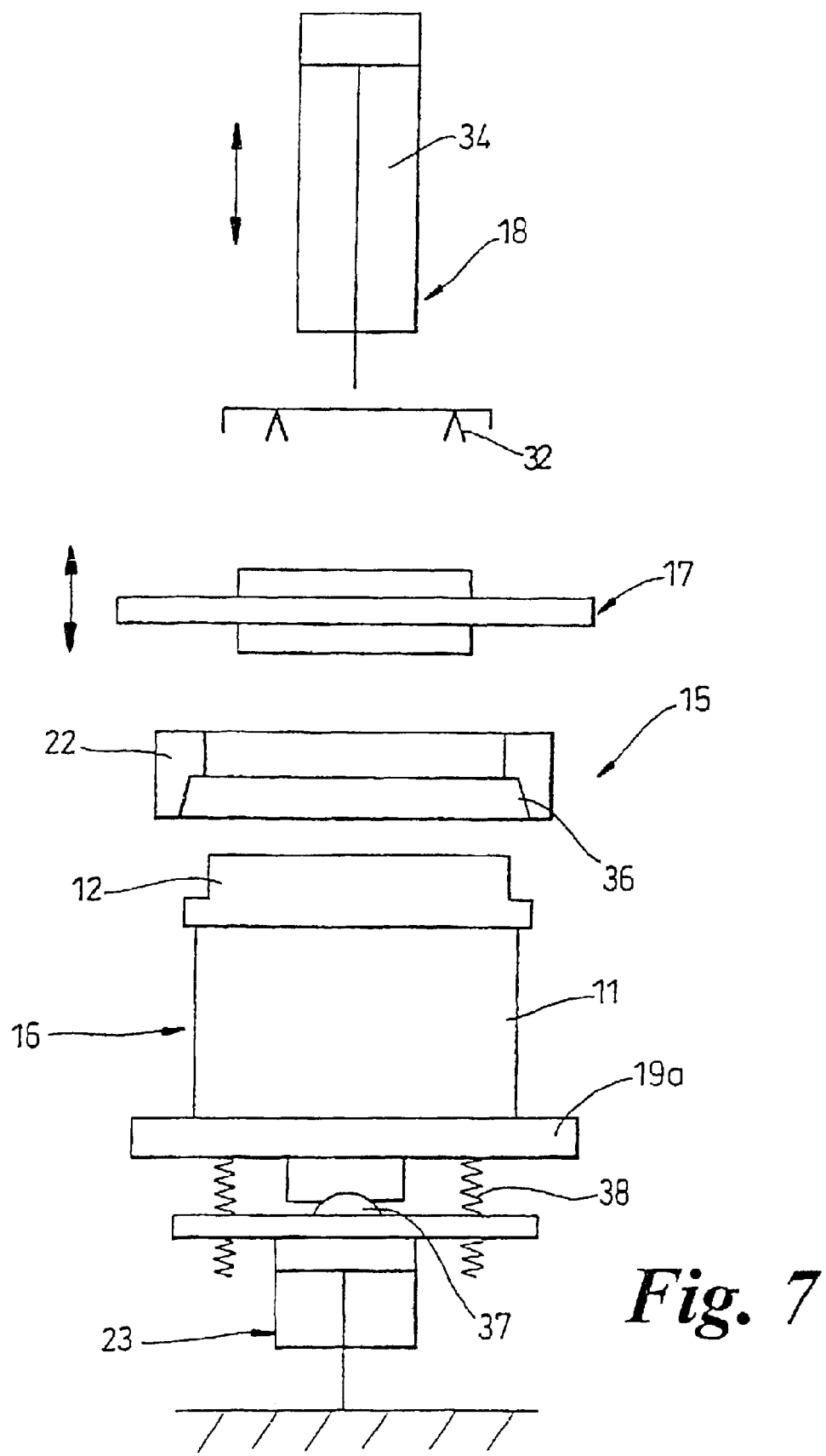
FIG. 7 is a schematic view of the apparatus of a second aspect of the invention showing a battery box on a floating support.

In FIG. 7, we see substantially the same apparatus as in FIG. 4, with a lid and battery box assembly locating unit 16, a heated platen unit 17 and a closure applicator 18. In this case, the apparatus includes a battery box lid seat 36 associated with stop 22. This seat is a fixed unit which positions the battery box lid when it is brought into engagement with the seat. The battery box sits on a battery support 19a. The battery support 19a is allowed to float due to the use of springs 38 and a spherical bearing 37. It is envisaged that other means of providing a floating support can be used, for example, using gimbal arrangements rather than springs and spherical bearings. What is important is that support 19a can more relative to the lid seat 36. Again, by engaging the lid 12, rather than box 11, any offset positioning of the lid 12 relative to the box 11, is substantially removed.

When using the apparatus, the lid pick up arrangement 18 secures a secondary closure. The battery box support 19 is brought into contact with the lid seat by ram 23. The springs 38 and bearing 37 allow the battery box lid to be positioned in the seat so that it will align with platen 17. The closure applicator 18 is brought into contact with platen 18 as the seat and lid are brought into contact and melting of the closure occurs which allows it to seal onto the assembly of a lid attached to the battery box.

It will be appreciated that as the platen and closure positions are determined on a box-by-box basis each closure should be accurately located, whatever the errors in orientation that have been created during the previous manufacturing step. It will also be appreciated, that the floating mounting of the platen 28 and closure 14 could be substituted by a positively driven arrangement which orientated the platen and closure in response to the detected position of the well 13 and/or of the lid 12. Such an arrangement is included within the invention, but in most circumstances it will be regarded as undesirably expensive. The detection could take place using probes to ascertain the location of the corners of the lid 12 or the well 13. These signals would allow computation of location signals which would be used to adjust the position and/or orientation of the platen and the lid holder. As the same degrees of freedom are required for both the driven and 'floating' approaches the 'floating' version is preferred except where there are difficulties in maintaining lid orientation.

What is claimed is:

1. Apparatus for applying a secondary closure to an assembly of a lid defining a seat for the secondary closure and attached to a battery box including at least one locating stop for locating the assembly in a predetermined position, a holder for the secondary closure, a heatable platen interposable between and engageable with the secondary closure and the lid to heat respective co-operably engageable surfaces thereof and a load applicator for engaging the heated surfaces to fix the secondary closure to the seat of the lid; wherein the locating stop locates the lid in a predetermined position and the apparatus includes a platen support for allowing the platen to move to take up the orientation of the engageable surface of the lid and a holder support to allow the orientation of the secondary closure to be determined by the orientation of the platen.

2. The apparatus according to claim 1, wherein at least one of the supports is a gimbal.

3. The apparatus according to claim 1, further comprising guides for engaging the lid to guide it into the predetermined position.

4. The apparatus according to claim 1, wherein the stop is mounted on guides.

5. Apparatus for applying a secondary closure to an assembly of a lid defining a seat for the secondary closure and attached to a battery box including at least one locating stop for locating the assembly in a predetermined position, a holder for the secondary closure, a heatable platen interposable between and engageable with the secondary closure and the lid to heat respective co-operably engageable surfaces thereof and a load applicator for engaging the heated surfaces to fix the secondary closure to the seat of the lid; wherein the locating stop locates the lid in a predetermined position and the apparatus further includes respective supports for each of the holder and platen for allowing rotation of the holder or platen about orthogonal axes lying in respective generally parallel planes which are further generally parallel to the predetermined position of the lid.

6. The apparatus according to claim 5, wherein at least one of the supports is a gimbal.

7. The apparatus according to claim 5, further comprising guides for engaging the lid to guide it into the predetermined position.

8. The apparatus according to claim 5, wherein the stop is mounted on guides.

9. A method of applying a secondary closure to an assembly of a lid attached to a battery box, the lid defining a seat for the secondary closure, the method comprising:

engaging a post face of a heated platen against the seat so that it takes the orientation of the seat;

engaging the secondary closure against the opposite face of the platen so that it takes the orientation of the platen;

removing the platen; and engaging the oriented secondary closure against the seat.

10. Apparatus for locating a secondary closure on the lid of a battery box including at least one detector for detecting the position and/or orientation of the lid or a part thereof and a closure applicator responsive to the detector for adjusting the orientation and/or position of the secondary closure prior to application, as a function of the detected position/orientation.

11. Apparatus for locating a secondary closure to an assembly of a lid attached to a battery box including at least one locating stop for locating the assembly in a predetermined position, a holder for a secondary closure, a heatable platen interposable between and engageable with the secondary closure and the lid to heat respective co-operably engageable surfaces thereof and a load applicator for engaging the heated surfaces to fix the secondary closure to the lid; wherein the locating stop comprises a seat for the battery box lid positionable between the heatable platen and the battery box, and the apparatus also includes a battery box support for allowing the battery box to move so that the battery box lid takes up the orientation of an engageable surface of the battery box lid seat; the battery box support being movable by a self adjusting mechanism.

12. The apparatus for locating a secondary closure according to claim 11, wherein the self adjusting mechanism comprises springs and spherical bearing arrangement.

13. The apparatus for locating a secondary closure according to claim 12, wherein the self adjusting mechanism includes one or more gimbals.

14. The apparatus for locating a secondary closure according to claim 11, wherein the self adjusting mechanism includes one or more gimbals.

* * * * *